(12) United States Patent
Ichinohe

(10) Patent No.: US 7,153,353 B2
(45) Date of Patent: Dec. 26, 2006

(54) CARNUBA SILICONE WAX

(75) Inventor: Shoji Ichinohe, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 754 days.

(21) Appl. No.: 10/299,910

(22) Filed: Nov. 20, 2002

(65) Prior Publication Data

US 2003/0097012 A1    May 22, 2003

(30) Foreign Application Priority Data

Nov. 21, 2001  (JP)  .............................. 2001-355641

(51) Int. Cl.
*C09D 191/06* (2006.01)
*C09D 11/12* (2006.01)
*B28B 7/38* (2006.01)
*A61K 8/92* (2006.01)
*C10M 105/32* (2006.01)
*C07F 7/06* (2006.01)

(52) U.S. Cl. .............................. 106/31.63; 106/38.25; 106/270; 106/502; 430/108.3; 508/205; 514/785; 554/77; 556/440; 556/442

(58) Field of Classification Search ............. 106/31.63, 106/38.25, 270, 502; 430/108.3; 508/205; 514/785; 554/77; 556/440, 442
See application file for complete search history.

(56) References Cited

U.S. PATENT DOCUMENTS 3,563,941 A * 2/1971 Plueddemann .............. 556/420
4,725,658 A * 2/1988 Thayer et al. ................ 528/15
5,888,485 A * 3/1999 O'Lenick et al. ............ 424/64

* cited by examiner

*Primary Examiner*—David M. Brunsman
(74) *Attorney, Agent, or Firm*—Millen, White, Zelano, Branigan, P.C.

(57) ABSTRACT

A carnuba silicone wax which does not contain free silicone oil. This wax is obtained by reacting a silicone compound having a substituent with reactivity to the hydroxyl group in natural carnuba wax, with this hydroxyl group. A carboxyl group may be introduced into the molecule by reacting this hydroxyl group with a cyclic acid anhydride, and a silicone compound having a group which can react directly with this carboxyl group is made to react. Alternatively, a hydrogen silicone may be hydrosilylated by a double bond introduced by reacting an epoxy compound having a double bond with this carboxyl group.

11 Claims, No Drawings

CARNUBA SILICONE WAX

FIELD OF THE INVENTION

This invention relates to a new carnuba silicone wax, and in particular, to a novel carnuba silicone wax which does not contain free silicone oil.

BACKGROUND OF THE INVENTION

In recent years, with the advent of high-speed PPC copiers and printers, there is a great demand for offset performance of toner. To meet this demand, a so-called carnuba silicone wax which used both carnuba wax and silicone oil was added to the toner. However, this carnuba silicone wax always contained some free silicone oil which was not bonded with the carnuba wax. Therefore, when this carnuba silicone wax was added to toner, there was the disadvantage that toner tended to form lumps when left for a long time due to the action of the free silicone oil.

The inventor carried out intensive studies to obtain a carnuba silicone wax which does not contain free silicone oil. It was discovered that a silicone compound could be easily introduced into this carnuba wax using a hydroxyl group contained in natural carnuba wax, and thereby arrived at the present invention.

It is therefore an object of this invention to provide a carnuba silicone wax which effectively does not contain free silicone oil.

SUMMARY OF THE INVENTION

The object of this invention is attained by reacting a silicone compound having a substituent with reactivity to the hydroxyl group in natural carnuba wax, with this hydroxyl group. Alternatively, a carboxyl group may be introduced into the molecule by reacting this hydroxyl group with a cyclic acid anhydride, and a silicone compound having a group which can react directly with this carboxyl group is made to react. Further, a hydrogen silicone may be hydrosilylated by a double bond introduced by reacting an epoxy compound having a double bond with this carboxyl group.

DETAILED DESCRIPTION OF THE INVENTION

The natural carnuba wax used by this invention is extracted from the leaf of the carnuba palm?. The principal component in this carnuba wax is a hydroxyacid ester having a melting point (degrees C.) of 80–86, an acid value of 2–10, a saponification value of 78–88, an iodine value of 7–14, and an acetyl value of 51–60. Such a natural carnuba wax can be easily acquired from Kato Yoko Ltd. or Noda Wax Ltd.

According to a first method of synthesizing the carnuba silicone wax of this invention which effectively does not contain free silicone oil, a silicone compound having a substituent with reactivity to the hydroxyl group contained in carnuba wax, is reacted with the above-mentioned hydroxyl group. In this case, it is preferred that the silicone compound used is linear, and in particular, that it is an oil. The above-mentioned substituent should preferably be an isocyanate or acid anhydride group which react with hydroxyl.

According to a second method of synthesizing the carnuba silicone wax of this invention, a carboxyl group is introduced into the carnuba wax molecule by making a cyclic acid anhydride react with the hydroxyl group of carnuba wax. Next, this carboxyl group which was introduced is made to react with a reactive silicone compound. In this case, examples of cyclic acid anhydrides which can be used are succinic anhydride, maleic anhydride and phthalic anhydride. The temperature at which the hydroxyl group and cyclic anhydride are made to react is preferably 50° C.–200° C., but more preferably 100° C.–160° C. In the reaction, a solvent may or may not be used, but if it is used, an aromatic solvent such as xylene or toluene is particularly preferred. It is also desirable to use a tertiary amine as a catalyst.

As examples of reactive silicone compounds which react with the carboxyl group, compounds having an amino group or an epoxy group as substituents are suitable. The temperature at which the carboxyl group is made to react with the amino group or epoxy group is preferably 50° C.–200° C., but more preferably 100° C.–160° C.

When making an amino group react, it is important to remove water generated from the reaction system using an ester adapter. Therefore, to remove water from the system during the above reaction, it is desirable to use a solvent which has a boiling point of 100° C. or more. In this case, it is preferred to use an aromatic solvent. On the other hand, when making an epoxy group react, a solvent may or may not be used.

According to a third method of synthesizing the carnuba silicone wax of this invention, a carboxyl group is introduced into carnuba wax by the reaction of the hydroxyl group in natural carnuba wax and a cyclic acid anhydride, and a double bond is introduced by reacting a compound having both a double bond and an epoxy group in the molecule. A hydrogen silicone is then hydroxysilylated by this double bond.

As the compound having a double bond and epoxy group in the molecule, it is preferred to use for example an allyl glycerol ether or vinyl cyclohexene epoxide, etc.

As the novel carnuba silicone wax of this invention does not contain free silicone oil, when added to toner, it does not cause coagulation of the toner with time. Therefore, the carnuba silicone wax of this invention is especially useful as a wax for addition to toner.

Further, the melting point of the wax of this invention is a high temperature of about 85° C., and as it is modified with silicone, it is also suitable as a wax for cosmetics. It can also be used as a surface treatment agent, as a demolding agent for various applications, or as a lubricating agent.

EXAMPLES

Hereafter, this invention will be described in further detail by specific examples, but this invention is not limited thereby.

Example 1

1,100 g (equivalent to 1 mole as OH) of carnuba wax having an acetyl value of 51 and 1,500 g of xylene were weighed out in a flask, and dehydrated at 145° C. for 1 hour. Next, 2,388 g (0.9 moles) of an isocyanate-functional silicone having the following average structural formula was dripped in while maintaining the internal temperature at 100° C., and the reaction was performed at that temperature for 5 hours. After this time had elapsed, the isocyanate group had dissipated and the reaction was completed.

The xylene was then stripped under reduced pressure, and 3,420 g (yield 98%) of carnuba silicone wax, transparent during thermofusion, was obtained. The melting point was measured by DSC. The melting point was 79–85° C.

Example 2

1,100 g (equivalent to 1 mole as OH) of carnuba wax having an acetyl value of 51 and 1,500 g of xylene were weighed out in a flask, and dehydrated at 145° C. for 1 hour. Next, 95 g (1 mole) of succinic anhydride and 18.5 g (0.1 mole) of tributylamine were introduced at 140° C., the reaction was performed under those conditions for 4 hours, and a carboxyl group was thereby introduced into a hydroxyl group of the carnuba wax. Next, 378 g (0.45 mols) of an amine-functional silicone having the following average structural formula was intoduced at 140° C., and the reaction was carried out under reflux of xylene while separating water using an ester adapter.

$H_2NC_3H_6Me_2SiO(Me_2SiO)_8SiMe_2C_3H_6NH_2$

After 3 hours, the stoichiometrical amount of water had separated so the reaction was stopped, and 1,520 g (yield 98%) of carnuba silicone wax, transparent during thermofusion, was then obtained by stripping the xylene under reduced pressure. When the melting point was measured by DSC, it was found to be 82–90° C.

Example 3

1,100 g (equivalent to 1 mole as OH) of carnuba wax having an acetyl value of 51 and 1,500 g of xylene were weighed out in a flask, and dehydrated at 145° C. for 1 hour. Next, 95 g (1 mole) of succinic anhydride and 18.5 g (0.1 mole) of tributylamine were introduced at 140° C., the reaction was performed under those conditions for 4 hours, and a carboxyl group was thereby introduced into a hydroxyl group of the carnuba wax. Next, 438 g (0.45 moles) of an epoxy-functional silicone having the following average structural formula was introduced at 140° C., and the reaction was carried out under reflux of xylene for 4 hours. After 4 hours, it was confirmed by infrared spectroscopy that the epoxy group had been eliminated.

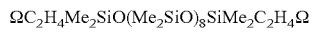

$\Omega C_2H_4Me_2SiO(Me_2SiO)_8SiMe_2C_2H_4\Omega$ (where, $\Omega$ is cyclohexane epoxide).

1,600 g (yield 98%) of carnuba silicone wax, transparent during thermofusion, was obtained by stripping the xylene under reduced pressure. When the melting point was measured by DSC, it was found to be 79–87° C.

Example 4

1,100 g (equivalent to 1 mole as OH) of carnuba wax having an acetyl value of 51 and 1,500 g of xylene were weighed out in a flask, and dehydrated at 145° C. for 1 hour. Next, 95 g (1 mole) of succinic anhydride and 18.5 g (0.1 mole) of tributylamine were introduced at 140° C., the reaction was performed under those conditions for 4 hours, and a carboxyl group was thereby introduced into a hydroxyl group of the carnuba wax.

Next, 248 g (2 moles) of a vinylcyclohexane epoxide was introduced at 140° C. The reaction was carried out under these conditions for 3 hours, and after reacting the carboxyl group with the epoxy group, the excess vinylcyclohexane epoxide, tributylamine catalyst and xylene solvent were removed by stripping. Next, 1,500 g of xylene were again introduced, 4 g of a 0.5% toluene solution of chloroplatinic acid and 660 g (0.45 moles) of a hydrogen silicone having the following structural formula were added, and the reaction was carried out at 120° C. for 5 hours. It was then confirmed that SiH had completely been eliminated.

$HMe_2SiO(Me_2SiO)_{18}SiMe_2H$ 1,960 g (yield 99%) of carnuba silicone wax, transparent during thermofusion, was obtained by stripping the xylene. When the melting point was measured by DSC, it was found to be 80–87° C.

What is claimed is:

1. A carnauba silicone wax formed by bonding a natural carnauba wax with a silicone compound via linkage other than SiOC bond, wherein the carnauba silicone wax is formed by reaction between a carboxyl group introduced by the reaction of the hydroxyl group in the natural carnauba wax and a cyclic acid anhydride, and a silicone having a functional group in the molecule which can react with this carboxyl group.

2. A carnauba silicone wax according to claim 1, wherein the cyclic acid anhydride is selected from a group consisting of succinic anhydride, maleic anhydride, and phthalic anhydride.

3. A carnauba silicone wax according to claim 1, wherein the functional group comprises an amino group or an epoxy group.

4. A method of synthesizing a carnauba silicone wax of claim 1, comprising the steps of
   (a) introducing a carboxyl group into the carnauba wax molecule by reacting a cyclic acid an hydride with a hydroxyl group of carnauba wax, and
   (b) reacting the carboxyl group of (a) with a silicone compound.

5. A method of claim 4, wherein steps (a) and (b) are carried out at a temperature between 50° C. and 200° C.

6. A toner, a cosmetic, a demolding agent, or a lubricant comprising a carnauba silicone wax of claim 1.

7. A carnauba silicone wax formed by bonding a natural carnauba wax with a silicone compound via linkage other than SiOC bond, wherein the carnauba silicone wax is formed by hydrosilylation of a hydrogen silicone with a double bond which is introduced by reacting a compound having both a double bond and an epoxy group in the molecule with the carboxyl group introduced by the reaction of the hydroxyl group in the natural carnauba wax and a cyclic acid anhydride.

8. A carnauba silicone wax according to claim 7, wherein the compound having both a double bond and an epoxy group comprises an allyl glycerol ether or a vinyl cyclohexane epoxide.

9. A method of synthesizing a carnauba silicone wax of claim 7, comprising the steps of
   (a) introducing a carboxyl group into the carnauba wax molecule by reacting a cyclic acid anhydride with a hydroxyl group of carnauba wax,
   (b) reacting a compound having both a double bond and an epoxy group in the molecule with the carboxyl group of (a), and
   (c) reacting a hydrogen silicone with the product from (b).

10. A method of claim 9, wherein steps (a), (b), and (c) are carried out at a temperature between 50° C. and 200° C.

11. A toner, a cosmetic, a demolding agent, or a lubricant comprising a carnauba silicone wax of claim 7.

* * * * *